United States Patent
Damnjanovic et al.

(10) Patent No.: US 12,058,735 B2
(45) Date of Patent: Aug. 6, 2024

(54) TRANSMIT RECEIVE POINT DIRECTIONAL TRANSMISSION FOR CHANNEL SENSING

(71) Applicant: QUALCOMM Incorporated, San Diego, CA (US)

(72) Inventors: Aleksandar Damnjanovic, Del Mar, CA (US); Yisheng Xue, San Diego, CA (US); Mostafa Khoshnevisan, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 17/645,358

(22) Filed: Dec. 21, 2021

(65) Prior Publication Data

US 2022/0248462 A1   Aug. 4, 2022

Related U.S. Application Data

(60) Provisional application No. 63/199,877, filed on Jan. 29, 2021.

(51) Int. Cl.
*H04W 74/0808* (2024.01)
*H04W 16/28* (2009.01)

(52) U.S. Cl.
CPC ....... *H04W 74/0808* (2013.01); *H04W 16/28* (2013.01)

(58) Field of Classification Search
CPC ............. H04W 74/0808; H04W 16/28; H04W 74/0816; H04B 7/0695
See application file for complete search history.

(56) References Cited

U.S. PATENT DOCUMENTS

| | | | |
|---|---|---|---|
| 2002/0158801 A1* | 10/2002 | Crilly, Jr. | H01Q 3/2605 342/378 |
| 2009/0015475 A1* | 1/2009 | Fujishiro | H04B 7/0691 342/372 |
| 2018/0115996 A1* | 4/2018 | Si | H04W 74/0808 |
| 2018/0302201 A1* | 10/2018 | Yoo | H04W 74/0816 |
| 2019/0306881 A1* | 10/2019 | Fakoorian | H04W 76/27 |
| 2020/0314906 A1 | 10/2020 | Goyal et al. | |
| 2020/0413268 A1 | 12/2020 | Yerramalli et al. | |
| 2021/0076359 A1* | 3/2021 | Sosnin | G01S 19/42 |
| 2021/0204322 A1* | 7/2021 | Lou | H04W 74/0875 |
| 2021/0307065 A1* | 9/2021 | Xue | H04W 52/16 |
| 2022/0132560 A1* | 4/2022 | Li | H04B 7/0404 |

(Continued)

OTHER PUBLICATIONS

International Search Report and Written Opinion—PCT/US2021/073069—ISA/EPO—Apr. 26, 2022.

*Primary Examiner* — Ivan O Latorre
(74) *Attorney, Agent, or Firm* — Harrity & Harrity, LLP

(57) ABSTRACT

Various aspects of the present disclosure generally relate to wireless communication. In some aspects, a first wireless communication device may detect that an antenna of a second wireless communication device is to perform a channel sensing procedure on a channel during a time occasion. The first wireless communication device may transmit, during the time occasion in one or more directions other than a direction of the antenna of the second wireless communication device, a signal that satisfies an energy detection threshold. Numerous other aspects are described.

30 Claims, 11 Drawing Sheets

(56) References Cited

U.S. PATENT DOCUMENTS

| | | | | |
|---|---|---|---|---|
| 2022/0248462 A1* | 8/2022 | Damnjanovic | ... | H04W 74/0808 |
| 2022/0256602 A1* | 8/2022 | Hong | ... | H04W 72/0453 |
| 2022/0287088 A1* | 9/2022 | Tiirola | ... | H04L 27/0006 |
| 2022/0287093 A1* | 9/2022 | Iyer | ... | H04W 74/0816 |
| 2023/0268975 A1* | 8/2023 | Lopez | ... | H04W 4/023 |
| | | | | 370/329 |
| 2023/0328630 A1* | 10/2023 | Zhu | ... | H04W 48/04 |
| | | | | 455/435.1 |

* cited by examiner

TRANSMIT RECEIVE POINT DIRECTIONAL TRANSMISSION FOR CHANNEL SENSING

CROSS-REFERENCE TO RELATED APPLICATION

This Patent Application claims priority to U.S. Provisional Patent Application No. 63/199,877, filed on Jan. 29, 2021, entitled "TRANSMIT RECEIVE POINT DIRECTIONAL TRANSMISSION FOR CHANNEL SENSING," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for directional transmission of transmit receive points for channel sensing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first wireless communication device includes detecting that an antenna of a second wireless communication device is to perform a channel sensing procedure on a channel during a time occasion, and transmitting, during the time occasion in one or more directions other than a direction of the antenna of the second wireless communication device, a signal that satisfies an energy detection threshold.

In some aspects, a method of wireless communication performed by a first wireless communication device includes transmitting, to a second wireless communication device, channel information indicating a channel in which a channel sensing procedure is to be performed during a time occasion, and performing the channel sensing procedure on the channel during the time occasion.

In some aspects, a first wireless communication device for wireless communication includes a memory and one or more processors coupled to the memory, the one or more processors configured to detect that an antenna of a second wireless communication device is to perform a channel sensing procedure on a channel during a time occasion, and transmit, during the time occasion in one or more directions other than a direction of the antenna of the second wireless communication device, a signal that satisfies an energy detection threshold.

In some aspects, a first wireless communication device for wireless communication includes a memory and one or more processors coupled to the memory, the one or more processors configured to transmit, to a second wireless communication device, channel information indicating a channel in which a channel sensing procedure is to be performed during a time occasion, and perform the channel sensing procedure on the channel during the time occasion.

In some aspects, a non-transitory computer-readable medium storing a set of instructions for wireless communication includes one or more instructions that, when executed by one or more processors of a first wireless communication device, cause the first wireless communication device to detect that an antenna of a second wireless communication device is to perform a channel sensing procedure on a channel during a time occasion, and transmit, during the time occasion in one or more directions other than a direction of the antenna of the second wireless communication device, a signal that satisfies an energy detection threshold.

In some aspects, a non-transitory computer-readable medium storing a set of instructions for wireless communication includes one or more instructions that, when executed by one or more processors of a first wireless communication device, cause the first wireless communication device to transmit, to a second wireless communication device, channel information indicating a channel in which a channel sensing procedure is to be performed during a time occasion, and perform the channel sensing procedure on the channel during the time occasion.

In some aspects, an apparatus for wireless communication includes means for detecting that an antenna of another apparatus is to perform a channel sensing procedure on a channel during a time occasion, and means for transmitting, during the time occasion in one or more directions other than a direction of the antenna of the other apparatus, a signal that satisfies an energy detection threshold.

In some aspects, an apparatus for wireless communication includes means for transmitting, to another apparatus, channel information indicating a channel in which a channel sensing procedure is to be performed during a time occasion. and means for performing the channel sensing procedure on the channel during the time occasion.

Aspects generally include a method, apparatus, system, computer program product, non-transitory computer-readable medium, user equipment, base station, wireless communication device, transmit receive point and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
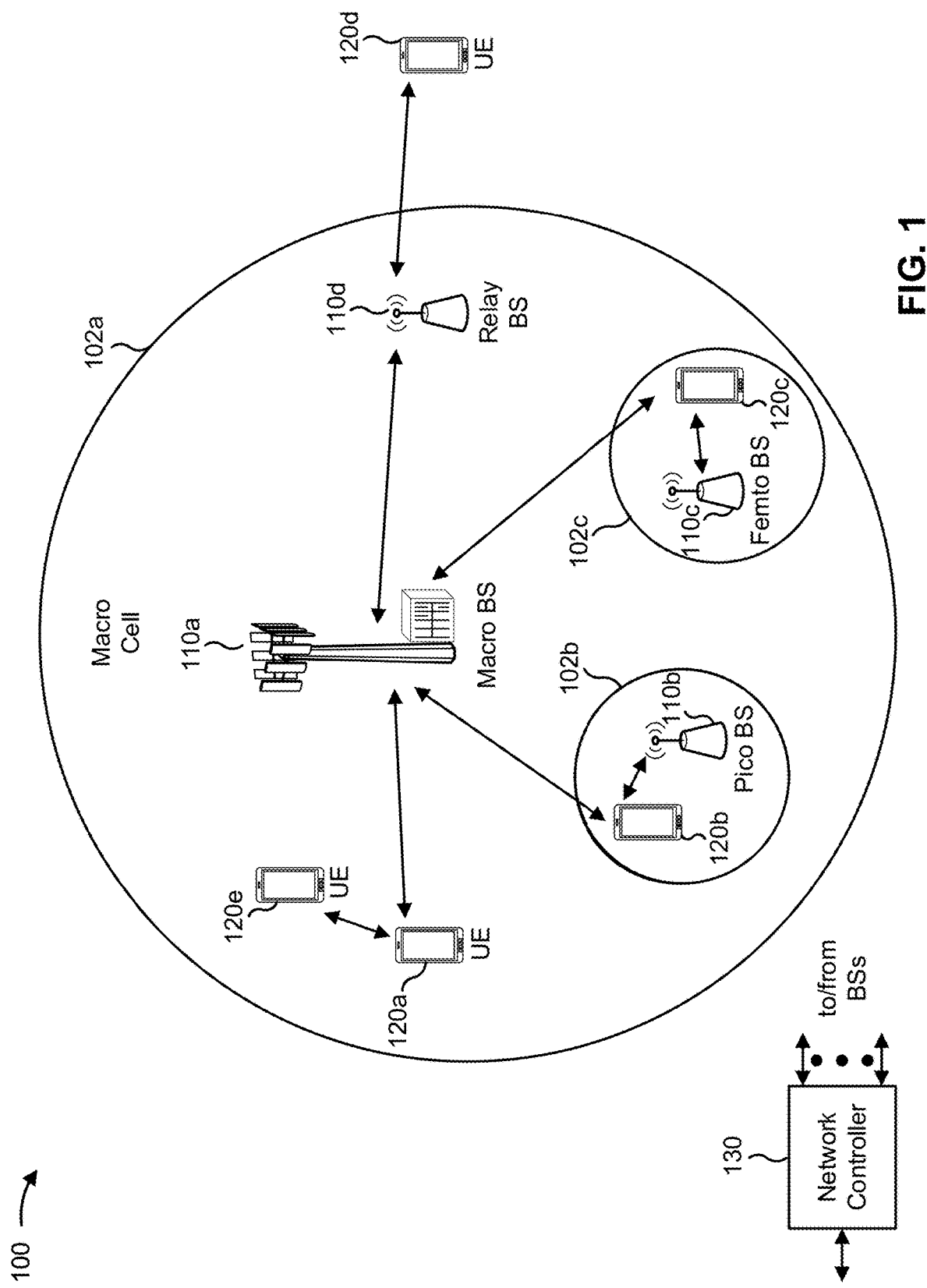
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include one or more relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another directly or indirectly via a wireless or wireline backhaul communication link.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, base station 110 may serve UEs of different categories and/or different UEs that support different capabilities. For example, base station 110 may serve a first category of UEs that have a less advanced capability (e.g., a lower capability and/or a reduced capability) and a second category of UEs that have a more advanced capability (e.g., a higher capability). A UE of the first category may have a reduced feature set compared to UEs of the second category and may be referred to as a reduced capability (RedCap) UE, a low tier UE, and/or an NR-Lite UE, among other examples. A UE of the first category may be, for example, an MTC UE, an eMTC UE, and/or an IoT UE. In some aspects, a UE of the first category may be a very low power (VLP) device. A UE of the second category may have an advanced feature set compared to UEs of the second category, and may be referred to as a baseline UE, a high tier UE, an NR UE, and/or a premium UE, among other examples. In some aspects, a UE of the first category has capabilities that satisfy requirements of a first (earlier) wireless communication standard but not a second (later) wireless communication standard, while a UE of the second category has capabilities that satisfy requirements of the second (later) wireless communication standard (and also the first wireless communication standard, in some cases).

For example, UEs of the first category may support a lower maximum modulation and coding scheme (MCS) than UEs of the second category (e.g., quadrature phase shift keying (QPSK) as compared to 256-quadrature amplitude modulation (QAM)), may support a lower maximum transmit power than UEs of the second category, may have a less advanced beamforming capability than UEs of the second category (e.g., may not be capable of forming as many beams as UEs of the second category), may require a longer processing time than UEs of the second category, may include less hardware than UEs of the second category (e.g., fewer antennas, fewer transmit antennas, and/or fewer receive antennas), and/or may not be capable of communicating on as wide of a maximum bandwidth part as UEs of the second category, among other examples. Additionally, or alternatively, UEs of the second category may be capable of communicating using a shortened transmission time interval (TTI) (e.g., a slot length of 1 ms or less, 0.5 ms, 0.25 ms, 0.125 ms, 0.0625 ms, depending on a sub-carrier spacing), and UEs of the first category may not be capable of communicating using the shortened TTI.

As indicated above, FIG. 1 is provided as an example. Other examples may differ from what is described with regard to FIG. 1.

Figure 2:
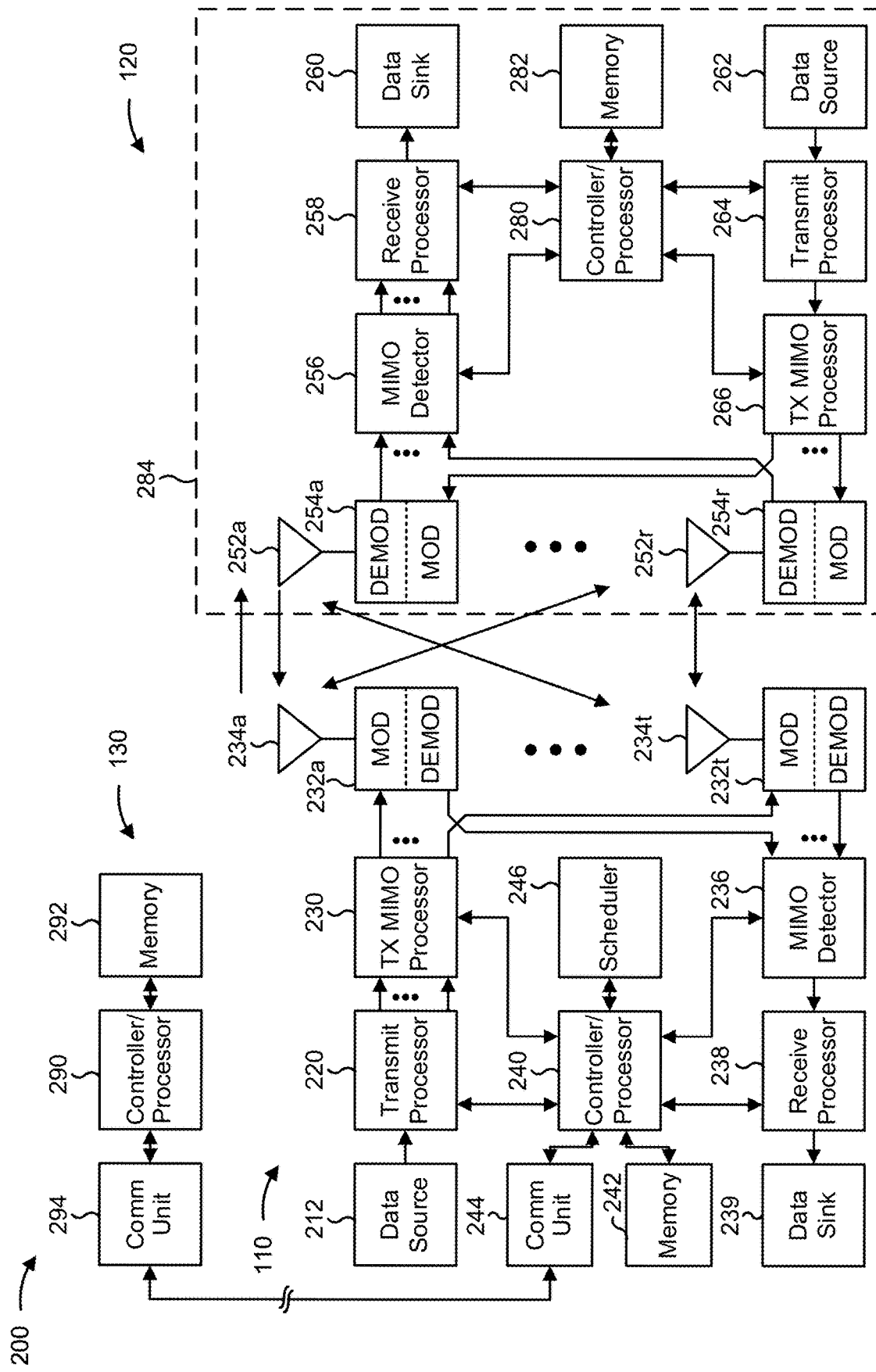
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more MCSs for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

One or more antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (e.g., with reference to FIGS. 5-11).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (e.g., with reference to FIGS. 5-11).

A controller/processor of a wireless communication device, such as a controller/processor 240 of base station 110, controller/processor 280 of UE 120, a controller/processor of a TRP, and/or any other component(s) of FIG. 2 may perform one or more techniques associated with directional transmission of TRPs for channel sensing, as described in more detail elsewhere herein. In some aspects, the wireless communication device described herein is base station 110, is included in the base station 110, or includes one or more components of base station 110 shown in FIG. 2. In some aspects, the wireless communication device described herein is UE 120, is included in UE 120, or includes one or more components of UE 120 shown in FIG. 2. For example, controller/processor 240 of base station 110, controller/processor 280 of UE 120, the control/processor of the wireless communication device, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

In some aspects, a first wireless communication device (e.g., base station 110, a TRP, a UE 120) includes means for detecting that an antenna of a second wireless communication device is to perform a channel sensing procedure on a channel during a time occasion, and/or means for transmitting, during the time occasion in one or more directions other than a direction of the antenna of the second wireless communication device, a signal that satisfies an energy detection threshold (EDT). In some aspects, the means for the first wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the first wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first wireless communication device includes means for determining the channel based at least in part on one or more measurements of one or more channels.

In some aspects, the first wireless communication device includes means for determining the channel based at least in part on channel information from the second wireless communication device.

In some aspects, the first wireless communication device includes means for determining the time occasion based at least in part on scheduling information that is coordinated between the first wireless communication device and the second wireless communication device.

In some aspects, a first wireless communication device (e.g., base station 110, a TRP, a UE 120) includes means for transmitting, to a second wireless communication device, channel information indicating a channel in which a channel sensing procedure is to be performed during a time occasion, and/or means for performing the channel sensing procedure on the channel during the time occasion. In some aspects, the means for the first wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the first wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

As indicated above, FIG. 2 is provided as an example. Other examples may differ from what is described with regard to FIG. 2.

Figure 3:
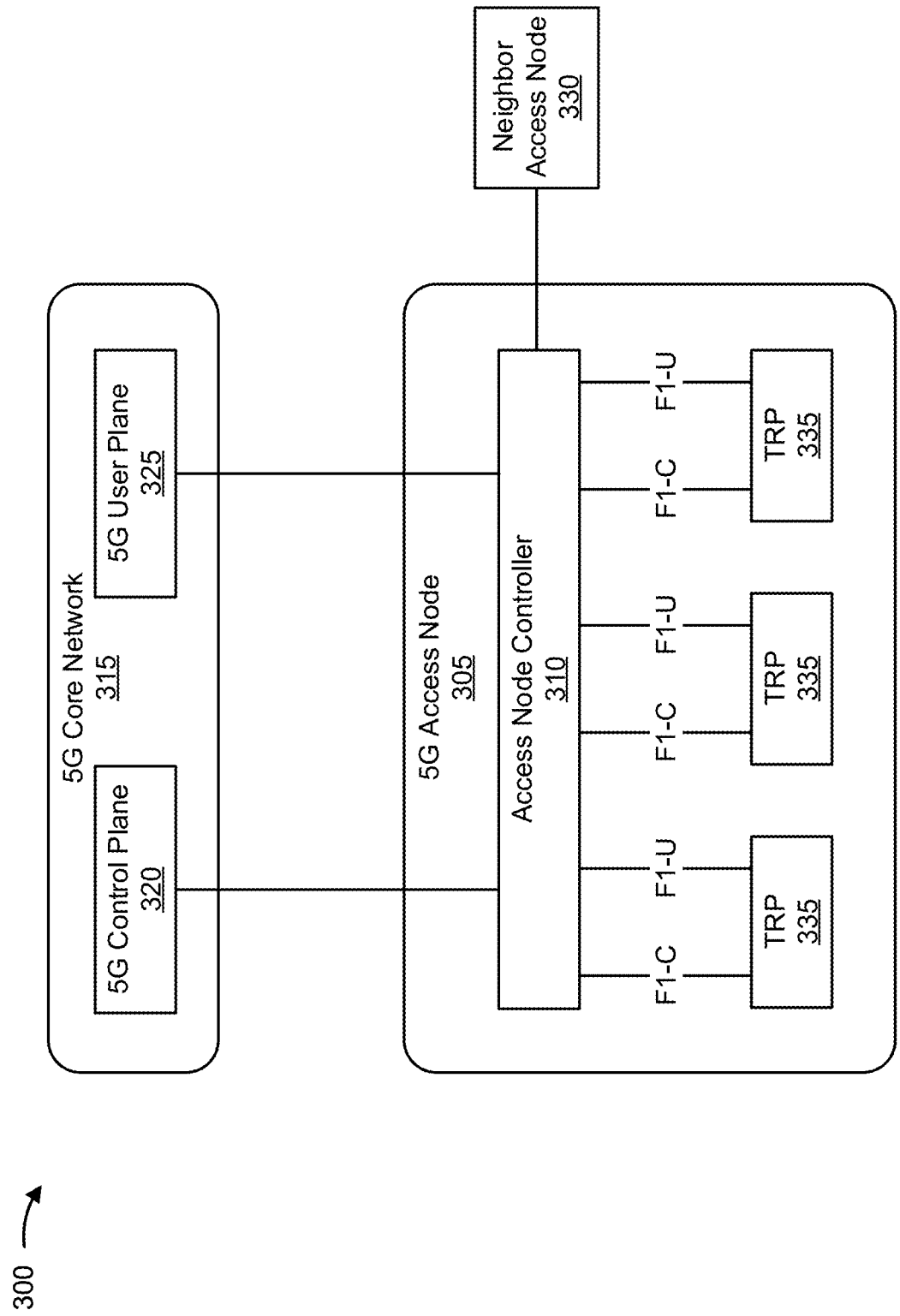
FIG. 3 illustrates an example logical architecture of a distributed radio access network, in accordance with the present disclosure.

FIG. 3 illustrates an example logical architecture of a distributed radio access network (RAN) 300, according to aspects of the present disclosure.

A 5G access node 305 may include an access node controller 310. The access node controller 310 may be a central unit (CU) of the distributed RAN 300. In some aspects, a backhaul interface to a 5G core network 315 may terminate at the access node controller 310. The 5G core network 315 may include a 5G control plane component 320 and a 5G user plane component 325 (e.g., a 5G gateway), and the backhaul interface for one or both of the 5G control plane and the 5G user plane may terminate at the access node controller 310. Additionally, or alternatively, a backhaul interface to one or more neighbor access nodes 330 (e.g., another 5G access node 305 and/or an LTE access node) may terminate at the access node controller 310.

The access node controller 310 may include and/or may communicate with one or more TRPs 335 (e.g., via an F1 Control (F1-C) interface and/or an F1 User (F1-U) interface). A TRP 335 may be a distributed unit (DU) of the distributed RAN 300. In some aspects, a TRP 335 may correspond to a base station 110 described above in connection with FIG. 1. For example, different TRPs 335 may be included in different base stations 110. Additionally, or alternatively, multiple TRPs 335 may be included in a single base station 110. In some aspects, a base station 110 may include a CU (e.g., access node controller 310) and/or one or more DUs (e.g., one or more TRPs 335). In some cases, a TRP 335 may be referred to as a cell, a panel, an antenna array, or an array.

A TRP 335 may be connected to a single access node controller 310 or to multiple access node controllers 310. In some aspects, a dynamic configuration of split logical functions may be present within the architecture of distributed RAN 300. For example, a packet data convergence protocol (PDCP) layer, a radio link control (RLC) layer, and/or a medium access control (MAC) layer may be configured to terminate at the access node controller 310 or at a TRP 335.

In some aspects, multiple TRPs 335 may transmit communications (e.g., the same communication or different communications) in the same TTI (e.g., a slot, a mini-slot, a subframe, or a symbol) or different TTIs using different quasi-co-location (QCL) relationships (e.g., different spatial parameters, different transmission configuration indicator (TCI) states, different precoding parameters, and/or different beamforming parameters). In some aspects, a TCI state may be used to indicate one or more QCL relationships. A TRP 335 may be configured to individually (e.g., using dynamic selection) or jointly (e.g., using joint transmission with one or more other TRPs 335) serve traffic to a UE 120.

As indicated above, FIG. 3 is provided as an example. Other examples may differ from what was described with regard to FIG. 3.

Figure 4:
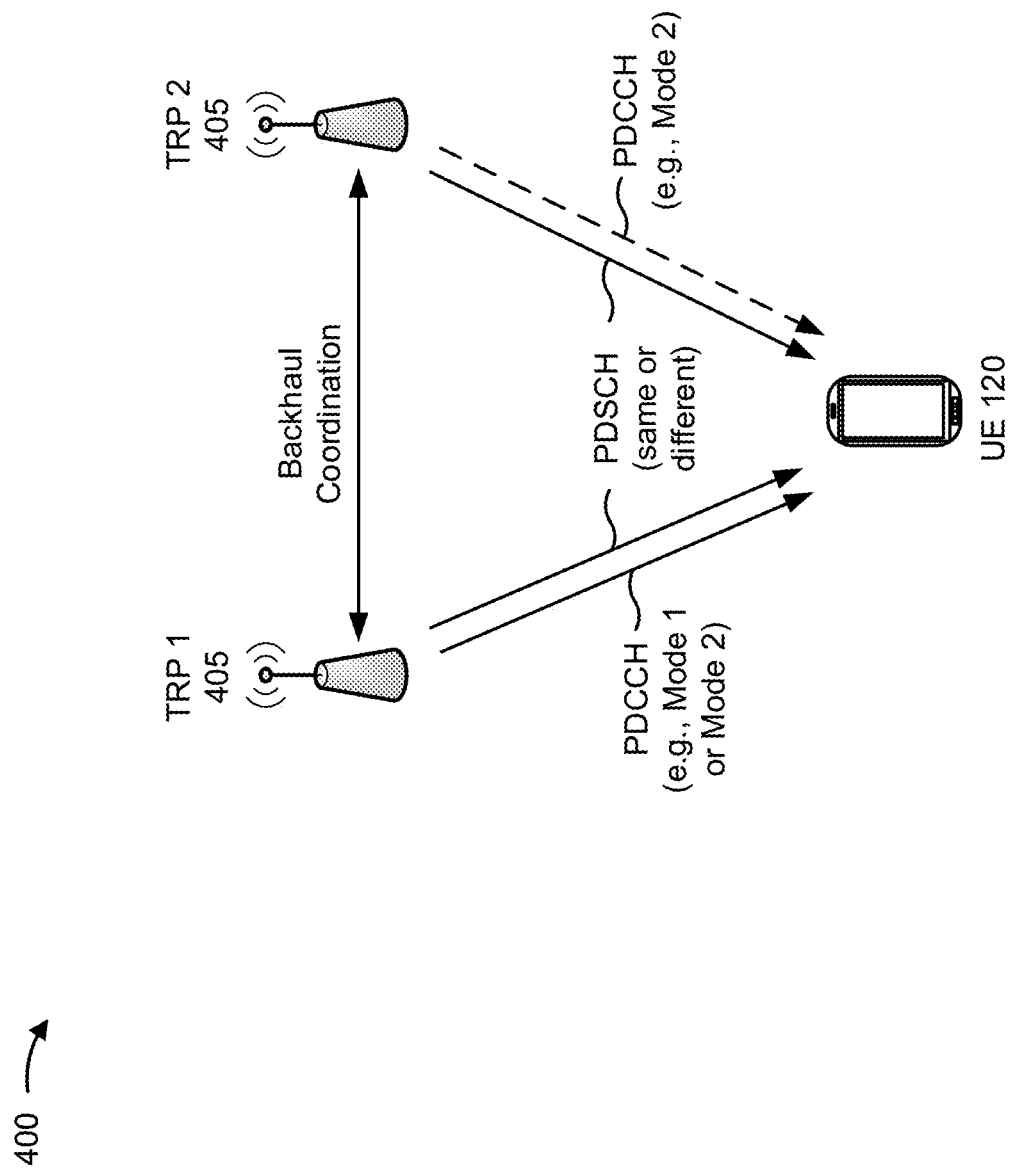
FIG. 4 is a diagram illustrating an example of multiple transmit receive point (multi-TRP) communication, in accordance with the present disclosure.

FIG. 4 is a diagram illustrating an example 400 of multi-TRP communication (sometimes referred to as multi-panel communication), in accordance with the present disclosure. As shown in FIG. 4, multiple TRPs 405 may communicate with the same UE 120. A TRP 405 may correspond to a TRP 335 described above in connection with FIG. 3.

The multiple TRPs 405 (shown as TRP 1 and TRP 2) may communicate with the same UE 120 in a coordinated manner (e.g., using coordinated multipoint transmissions) to improve reliability and/or increase throughput. TRPs 405 may coordinate such communications via an interface between TRPs 405 (e.g., a backhaul interface and/or an access node controller 310). The interface may have a smaller delay and/or higher capacity when TRPs 405 are co-located at the same base station 110 (e.g., when TRPs 405 are different antenna arrays or panels of the same base station 110) and may have a larger delay and/or lower capacity (as compared to co-location) when the TRPs 405 are located at different base stations 110. The different TRPs 405 may communicate with UE 120 using different QCL relationships (e.g., different TCI states), different DMRS ports, and/or different layers (e.g., of a multi-layer communication).

In a first multi-TRP transmission mode (e.g., Mode 1), a single physical downlink control channel (PDCCH) may be used to schedule downlink data communications for a single physical downlink shared channel (PDSCH). In this case, multiple TRPs 405 (e.g., TRP 1 and TRP 2) may transmit communications to the UE 120 on the same PDSCH. For example, a communication may be transmitted using a single codeword with different spatial layers for different TRPs 405 (e.g., where one codeword maps to a first set of layers transmitted by a first TRP 405 and maps to a second set of layers transmitted by a second TRP 405). As another example, a communication may be transmitted using multiple codewords, where different codewords are transmitted by different TRPs 405 (e.g., using different sets of layers). In either case, different TRPs 405 may use different QCL relationships (e.g., different TCI states) for different DMRS ports corresponding to different layers. For example, a first TRP 405 may use a first QCL relationship or a first TCI state for a first set of DMRS ports corresponding to a first set of layers, and a second TRP 405 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 405, and a second PDCCH may schedule a second codeword to be transmitted by a second TRP 405. Furthermore, first DCI (e.g., transmitted by the first TRP 405) may schedule a first PDSCH communication associated with a first set of DMRS ports with a first QCL relationship (e.g., indicated by a first TCI state) for the first TRP 405, and second DCI (e.g., transmitted by the second TRP 405) may schedule a second PDSCH communication associated with a second set of DMRS ports with a second QCL relationship (e.g., indicated by a second TCI state) for the second TRP 405. In this case, DCI (e.g., having DCI format 1_0 or DCI format 1_1) may indicate a corresponding TCI state for a TRP 405 corresponding to the DCI. The TCI field of a DCI indicates the corresponding TCI state (e.g., the TCI field of the first DCI indicates the first TCI state and the TCI field of the second DCI indicates the second TCI state).

As indicated above, FIG. 4 is provided as an example. Other examples may differ from what is described with respect to FIG. 4.

Figure 5:
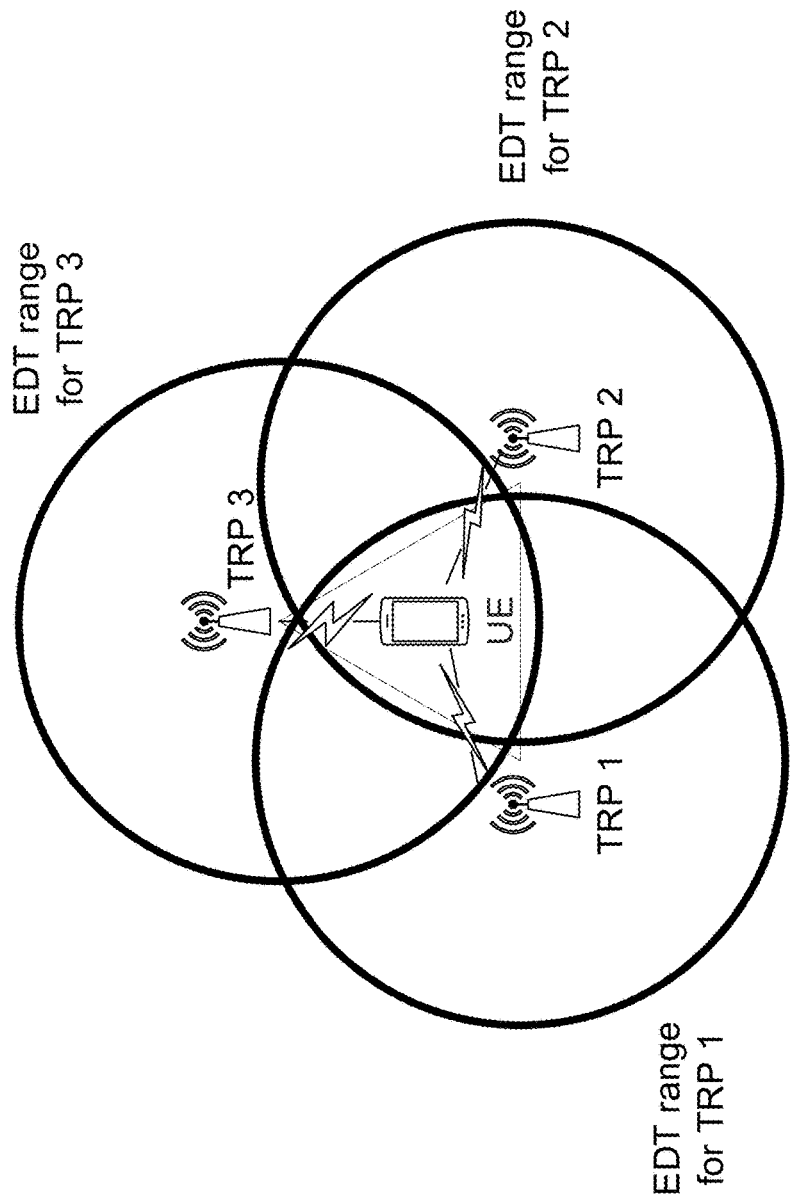
FIG. 5 is a diagram illustrating an example of TRPs and energy detection thresholds, in accordance with the present disclosure.

FIG. 5 is a diagram illustrating an example 500 of TRPs and energy detection thresholds, in accordance with the present disclosure.

Transmissions on unlicensed carriers may require a wireless communication device, such as a TRP or UE, to determine whether a carrier (frequency channel) is clear for transmission. Listen before talk (or listen before transmit) (LBT) is a mechanism that the TRP or the UE may use to sense whether a channel is clear. If the TRP performs LBT on a channel and the channel is clear, this may be called an LBT success. If the TRP performs LBT on the channel and the channel is not clear, this may be called an LBT failure. The LBT procedure may fail if the TRP senses an energy level on a channel that satisfies an EDT. For example, if the energy level on the channel equals or exceeds the EDT, LBT may fail. Once the energy level does not satisfy the EDT (e.g., falls below the EDT), the TRP may begin a countdown before using the channel. Load-based equipment may use the countdown. If the countdown involves a single count of 1, the TRP may be silent for a time period before counting down. The TRP may complete the countdown before a supervising device (e.g., a gNB, another TRP), can access the channels or schedule a UE to access the channel.

LBT may operate with success if a single TRP is transmitting to one or more UEs. However, LBT may have issues when multiple TRPs intend to jointly transmit data to a UE. Denser TRP arrangements may provide for high area capacity, but multiple signals from multiple TRPs may overlap in a region, such as shown by the EDT range circles in example 500 for TRP 1, TRP 2, and TRP 3. Devices within an EDT range circle may be exposed to an energy level that meets or exceeds an EDT. Devices outside the EDT range circle may not sense enough energy on a channel or may sense energy at an energy level that is below the EDT. Some devices, such as the UE shown in example 500, may be in a region of overlapping EDT ranges, and the UE may not be able to sense a clear channel if nearby TRPs are transmitting a signal on the channel without any scheduling or coordination (e.g., the UE is not served by a network of a multi-TRP system). In other words, a non-network (non-cooperating) device may be blocked by overlapping signal areas.

As indicated above, FIG. 5 is provided as an example. Other examples may differ from what is described with regard to FIG. 5.

Figure 6:
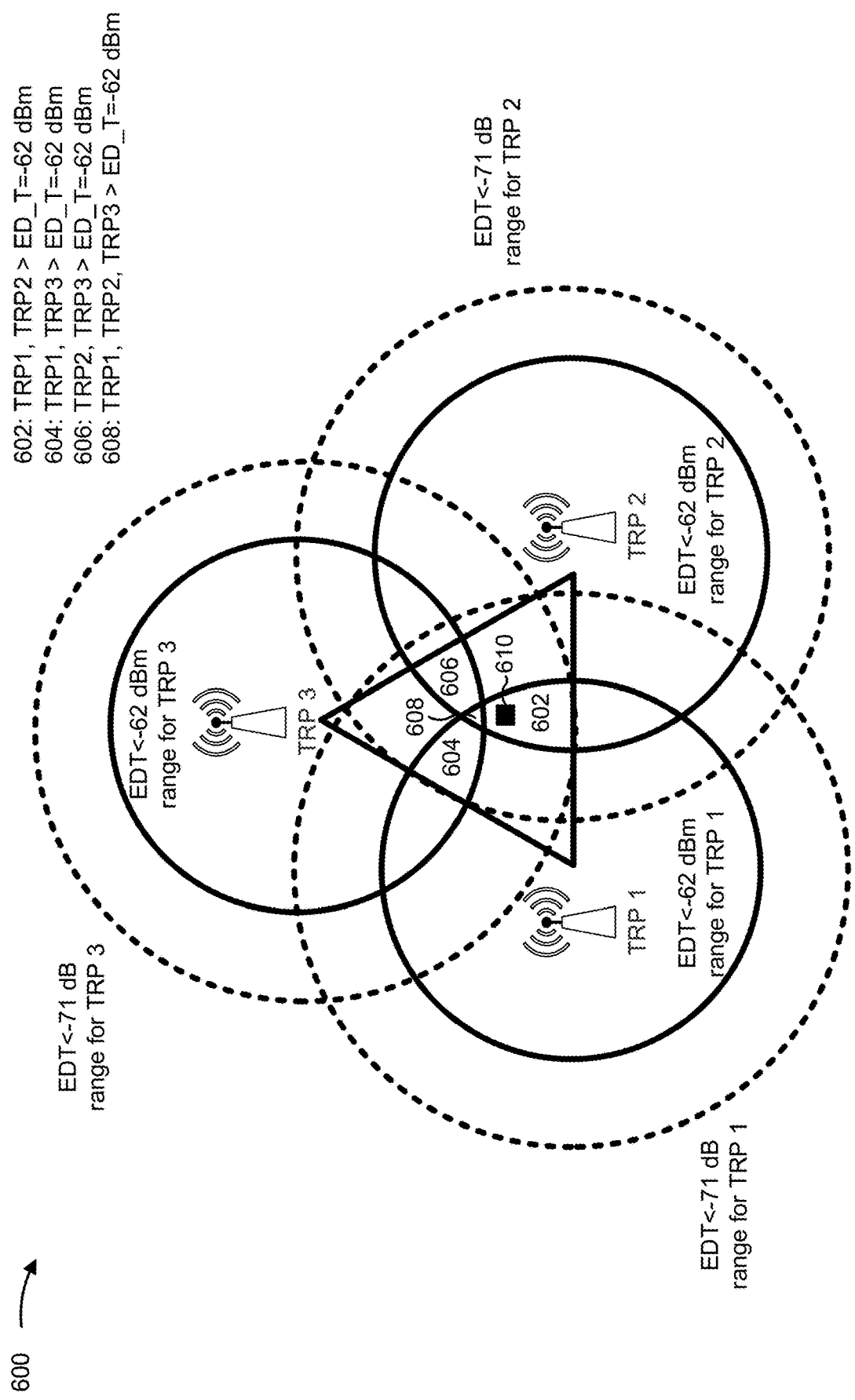
FIG. 6 is a diagram illustrating an example of a very low power device within energy detection threshold ranges of multiple TRPs, in accordance with the present disclosure.

FIG. 6 is a diagram illustrating an example 600 of a VLP device within EDT ranges of multiple TRPs, in accordance with the present disclosure. The TRPs may form a multi-TRP system. Signal ranges for an EDT less than −71 decibel-milliwatts (dBm) (for 6 GHz and a maximum total power (Pmax) of 23 dBm) are shown by dashed circles, and signal ranges for an EDT less than −62 dBm (Pmax=14 dBm) are shown by solid circles.

Example 600 shows an overlapping region 602 between TRP 1 and TRP 2, an overlapping region 604 between TRP 1 and TRP 3, and an overlapping region 606 between TRP 2 and TRP 3. Example 600 also shows an overlapping region 608 between TRP 1, TRP 2, and TRP 3. Regions 602, 604, 606, and/or 608 may be considered "dead zones." A VLP device 610 is shown to reside in region 602.

While the multi-TRP system may serve devices that subscribe to an associated network, the TRPs and the served devices may have to compete for clear channels with other devices, such as VLP devices, that are not part of the network. These VLP devices may occupy channels, introduce interference, and/or otherwise cause issues with the network of the multi-TRP system. Some VLP devices may even utilize a higher EDT than the TRPs. As a result, communications for the network of the multi-TRPs may degrade, which causes the TRPs and served UEs to waste power, processing resources, and signaling resources.

As indicated above, FIG. 6 is provided as an example. Other examples may differ from what is described with regard to FIG. 6.

Figure 7:
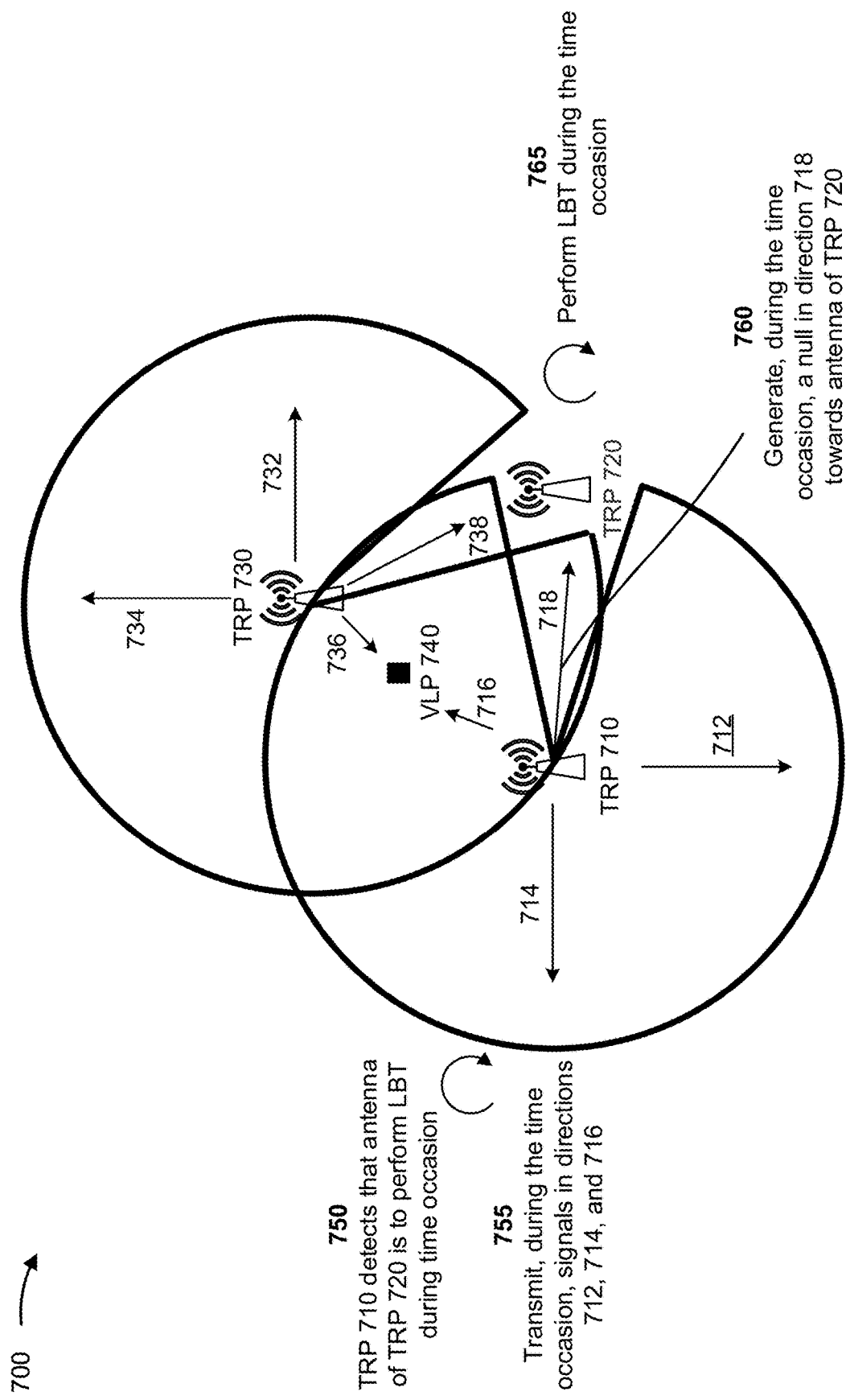
FIG. 7 is a diagram illustrating an example of TRP directional transmission for channel sensing, in accordance with the present disclosure.

FIG. 7 is a diagram illustrating an example 700 of TRP directional transmission for channel sensing, in accordance with the present disclosure. Example 700 shows a first TRP 710 that is configured to transmit one or more signals in multiple directions, such as directions 712, 714, 716, and 718. Example 700 also shows a second TRP 720 that is configured to transmit and receive signals. Example 700 also shows a third TRP 730 that is configured to transmit one or more signals in multiple directions, such as directions, 732, 734, 736, and 738. TRP 710, TRP 720, and TRP 730 may be part of a multi-TRP system. Example 700 shows a VLP device 740 that is not served by the multi-TRP system.

According to various aspects of the present disclosure, TRP 710 and TRP 730 may coordinate to transmit signals on a channel in multiple directions during a time occasion, except towards an antenna of TRP 720. Meanwhile, TRP 720 may use the antenna to perform an LBT procedure on the channel during the time occasion. In some aspects, TRP 710 and TRP 730 may transmit, during the time occasion, signals with an energy level above an EDT, while directing little or no energy (less than the EDT) towards the antenna of TRP 720. For example, transmissions may be directed in all other directions but towards TRP 720. In some aspects, TRP 710 may generate a null in the direction of TRP 720. In this way, TRP 720 may successfully perform LBT on the channel with the antenna and access the channel, while VLP device 740, within a region of overlapping EDT ranges, is effectively blocked from using the channel. In this way, throughput and channel conditions may improve for the multi-TRP system, which conserves power, processing resource, and signaling resources.

In more detail, as shown by reference number 750, TRP 710 may detect that an antenna of TRP 720 is to perform a channel sensing operation (e.g., an LBT procedure) during the time occasion. TRP 710 may determine the channel based at least in part on measurements or channel information from TRP 720. TRP 710 may also determine a channel based at least in part on measurements of reference signals from TRP 720 on channels and/or beams that are reciprocal with TRP 710. TRP 710 may determine the time occasion based at least in part on scheduling that is coordinated between the TRPs.

As shown by reference number 755, TRP 710 may transmit, during the time occasion, a signal on a channel in directions 712, 714, and 716, but not in direction 718 towards the antenna of TRP 720. The signal may satisfy (e.g., meet or exceed) an EDT in directions 712, 714, and 716, but not in direction 718. As shown by reference number 760, TRP 710 may generate a null in direction 718 towards the antenna of TRP 720. The null may be generated by two antennas with offset phases that cancel each other's energy. In some aspects, the time occasion may be a short interval in which TRP 710 uses suboptimal beamforming towards TRP 720.

TRP 730 may also transmit signals above the EDT in directions 732, 734, and 736, but not in direction 738. TRP 730 may also generate a null in direction 738 towards the antenna of TRP 720. In this way, TRP 720 may successfully perform LBT, while the signals in directions 716 and 736 cause VLP device 740 to fail its channel sensing or LBT procedure. That is, TRP 710, TRP 720, and TRP 730 may coordinate to enhance access to the channel by TRP 720 during the time occasion, while effectively blocking VLP device 740 from accessing the channel during the time occasion. As shown by reference number 765, TRP 720 may perform the LBT procedure during the time occasion. The LBT may be successful.

In some aspects, instead of TRPs that are in fixed locations, directional transmission for channel sensing may be performed by a group of cooperating UEs that coordinate access to the channel. The detected energy level may be above EDT everywhere except for at a location of a cooperating device when LBT is to be performed. In some aspects, a mobile UE may perform channel estimation multiple times, or at least more often than in the case of a static TRP. By directing transmissions away from a coordinating device that is to perform LBT, the device may be more successful in accessing the channel than a non-cooperating VLP device.

In some aspects, cooperating TRPs may provide access opportunities to non-cooperating devices (including non-cooperating VLP devices) by coordinating silence intervals. Coordinated silence intervals may include time intervals where all cooperating devices, such as cooperating TRPs refrain from transmitting and/or refrain from scheduling supervised devices such as served UEs.

As indicated above, FIG. 7 is provided as an example. Other examples may differ from what is described with regard to FIG. 7.

Figure 8:
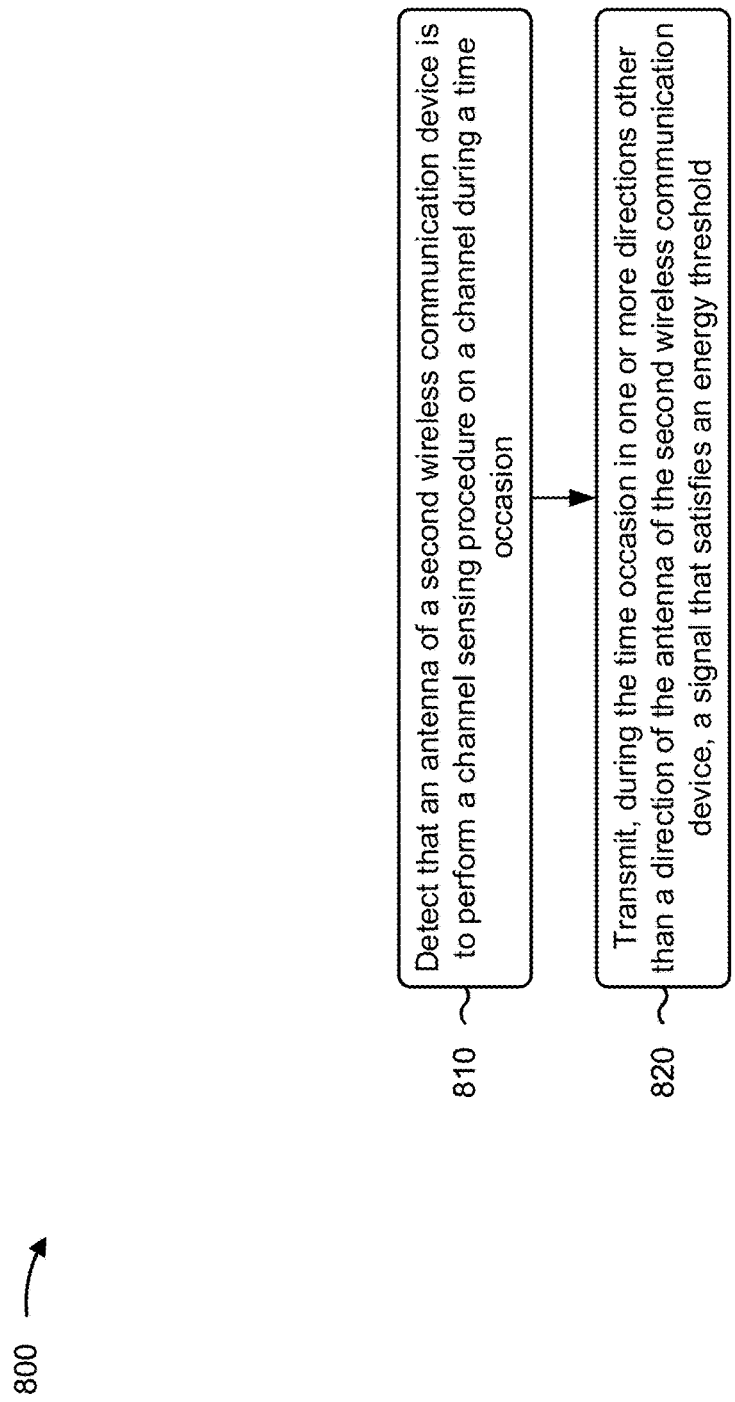
FIG. 8 is a diagram illustrating an example process performed, for example, by a first wireless communication device, in accordance with the present disclosure.

FIG. 8 is a diagram illustrating an example process 800 performed, for example, by a first wireless communication device, in accordance with the present disclosure. Example process 800 is an example where the first wireless communication device (e.g., TRP 405 depicted in FIG. 4, a TRP depicted in FIGS. 5-6, TRP 710 depicted in FIG. 7) performs operations associated with TRP directional transmission for channel sensing.

As shown in FIG. 8, in some aspects, process 800 may include detecting that an antenna of a second wireless communication device is to perform a channel sensing procedure on a channel during a time occasion (block 810). For example, the first wireless communication device (e.g., using determination component 1008 depicted in FIG. 10) may detect that an antenna of a second wireless communication device is to perform a channel sensing procedure on a channel during a time occasion, as described above.

As further shown in FIG. 8, in some aspects, process 800 may include transmitting, during the time occasion in one or more directions other than a direction of the antenna of the second wireless communication device, a signal that satisfies an energy detection threshold (block 820). For example, the first wireless communication device (e.g., using transmission component 1004 depicted in FIG. 10) may transmit, during the time occasion in one or more directions other than a direction of the antenna of the second wireless communication device, a signal that satisfies an energy detection threshold, as described above.

Process 800 may include additional aspects, such as any single aspect or any combination of aspects described below and/or in connection with one or more other processes described elsewhere herein.

In a first aspect, transmitting the signal that satisfies the energy detection threshold in one or more directions other than the direction of the antenna includes generating, during the time occasion, a null signal in the direction of the antenna.

In a second aspect, alone or in combination with the first aspect, transmitting the signal that satisfies the energy detection threshold in one or more directions other than the direction of the antenna includes transmitting a signal towards the antenna of the second wireless communication device that does not satisfy the energy detection threshold.

In a third aspect, alone or in combination with one or more of the first and second aspects, transmitting the signal that satisfies the energy detection threshold in one or more directions other than the direction of the antenna includes not transmitting signal energy towards the antenna of the second wireless communication device.

In a fourth aspect, alone or in combination with one or more of the first through third aspects, transmitting the signal that satisfies the energy detection threshold in one or more directions other than the direction of the antenna includes transmitting the signal that satisfies the energy detection threshold in one or more directions other than the direction of the antenna in coordination with a third wireless communication device that is to transmit a signal that satisfies the energy detection threshold in one or more directions other than a direction of the antenna from the third wireless communication device.

In a fifth aspect, alone or in combination with one or more of the first through fourth aspects, the channel sensing procedure is an LBT procedure.

In a sixth aspect, alone or in combination with one or more of the first through fifth aspects, process 800 includes determining the channel based at least in part on one or more measurements of one or more channels.

In a seventh aspect, alone or in combination with one or more of the first through sixth aspects, process 800 includes determining the channel based at least in part on channel information from the second wireless communication device.

In an eighth aspect, alone or in combination with one or more of the first through seventh aspects, process 800 includes determining the time occasion based at least in part on scheduling information that is coordinated between the first wireless communication device and the second wireless communication device.

In a ninth aspect, alone or in combination with one or more of the first through eighth aspects, the first wireless communication device and the second wireless communication device are TRPs in a multi-TRP system that coordinates access to the channel.

In a tenth aspect, alone or in combination with one or more of the first through ninth aspects, the first wireless communication device and the second wireless communication device are UEs in a group of UEs that coordinate access to the channel.

In an eleventh aspect, alone or in combination with one or more of the first through tenth aspects, process 800 includes coordinating, with one or more other wireless communication devices, another time occasion during which the first wireless communication device and the one or more other wireless communication devices refrain from transmitting and during which served UEs are not scheduled to transmit.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
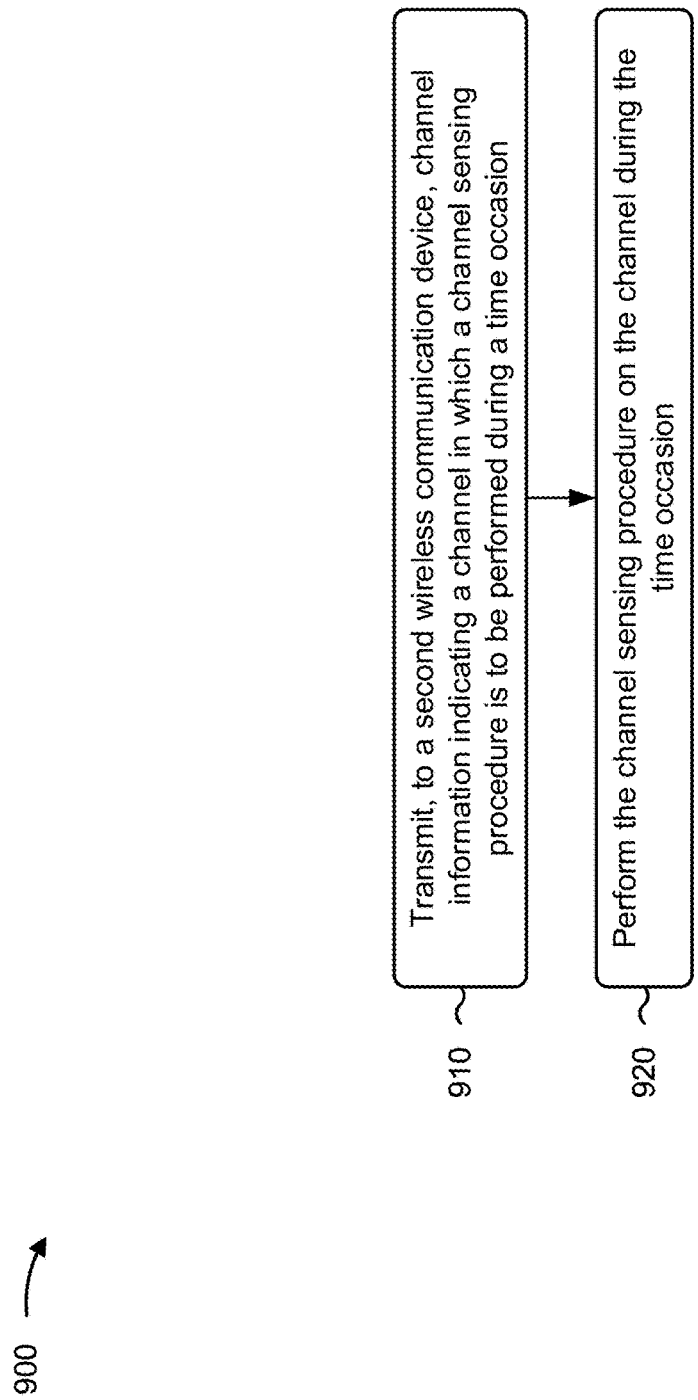
FIG. 9 is a diagram illustrating an example process performed, for example, by a first wireless communication device, in accordance with the present disclosure.

FIG. 9 is a diagram illustrating an example process 900 performed, for example, by a first wireless communication device, in accordance with the present disclosure. Example process 900 is an example where the first wireless communication device (e.g., TRP 405 depicted in FIG. 4, a TRP depicted in FIGS. 5-6, TRP 720 depicted in FIG. 7) performs operations associated with TRP directional transmission for channel sensing.

As shown in FIG. 9, in some aspects, process 900 may include transmitting, to a second wireless communication device, channel information indicating a channel in which a channel sensing procedure is to be performed during a time occasion (block 910). For example, the first wireless communication device (e.g., using transmission component 1104 depicted in FIG. 11) may transmit, to a second wireless communication device, channel information indicating a channel in which a channel sensing procedure is to be performed during a time occasion, as described above.

As further shown in FIG. 9, in some aspects, process 900 may include performing the channel sensing procedure on the channel during the time occasion (block 920). For example, the first wireless communication device (e.g., using sensing component 1108 depicted in FIG. 11) may perform the channel sensing procedure on the channel during the time occasion, as described above.

Process 900 may include additional aspects, such as any single aspect or any combination of aspects described below and/or in connection with one or more other processes described elsewhere herein.

In a first aspect, transmitting the channel information includes transmitting the channel information in response to a request from the second wireless communication device for the channel information.

In a second aspect, alone or in combination with the first aspect, the first wireless communication device and the second wireless communication device are TRPs in a multi-TRP system that coordinates access to the channel.

In a third aspect, alone or in combination with one or more of the first and second aspects, the first wireless communication device and the second wireless communication device are UEs in a group of UEs that coordinate access to the channel.

In a fourth aspect, alone or in combination with one or more of the first through third aspects, performing the channel sensing procedure includes performing an LBT procedure.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
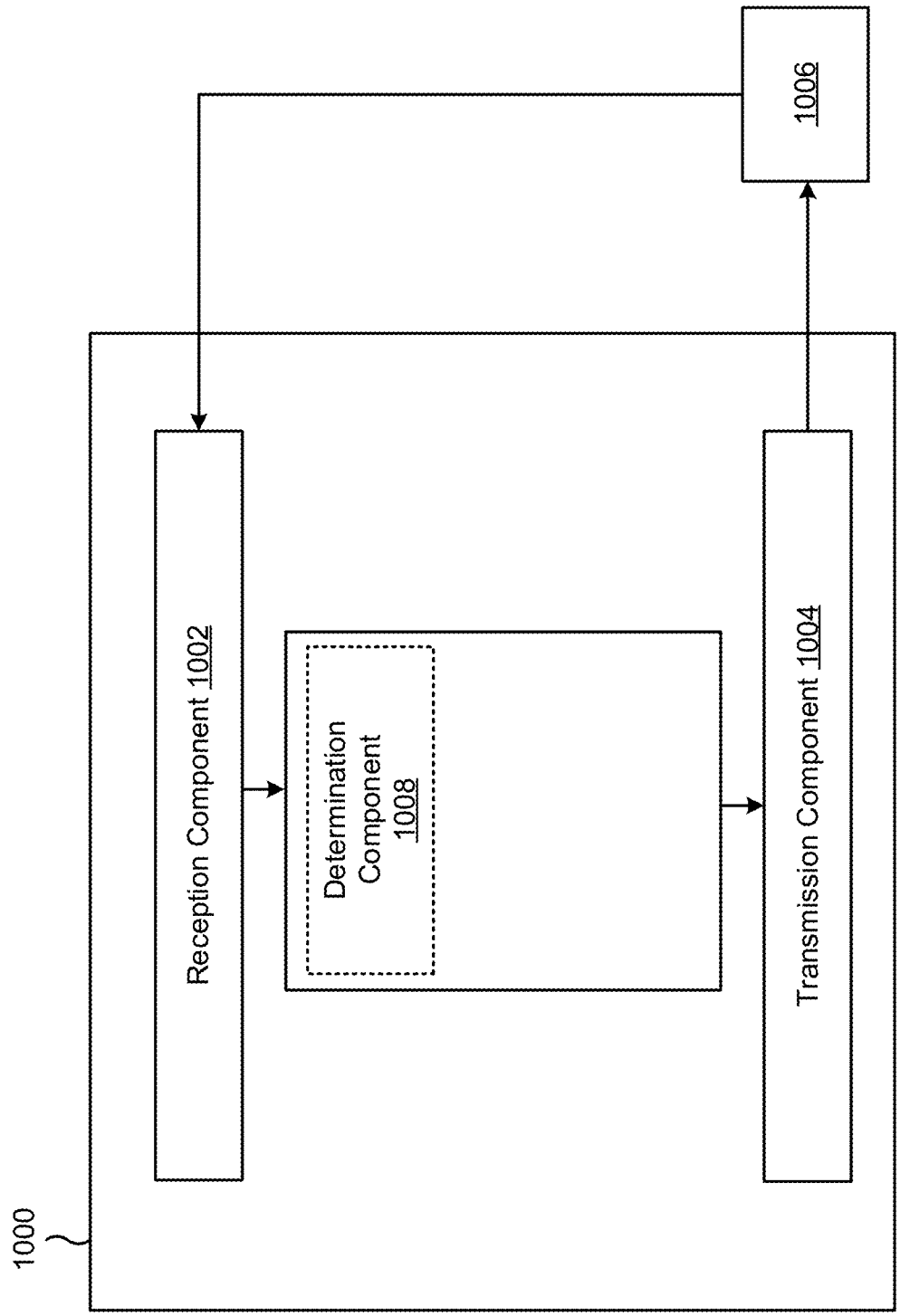
FIGS. 10-11 are block diagrams of example apparatuses for wireless communication, in accordance with the present disclosure.

FIG. 10 is a block diagram of an example apparatus 1000 for wireless communication. The apparatus 1000 may be a first wireless communication device (such as a TRP or a UE), or a first wireless communication device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, a TRP, or another wireless communication device) using the reception component 1002 and the transmission component 1004. As further shown, the apparatus 1000 may include a determination component 1008, among other examples.

In some aspects, the apparatus 1000 may be configured to perform one or more operations described herein in connection with FIGS. 1-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the first wireless communication device described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a demodulator, a MIMO detector, a receive processor, a controller/processor, a memory, or a combination thereof, of the first wireless communication device described above in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the first wireless communication device described above in connection with FIG. 2. In some aspects, the transmission component 1004 may be co-located with the reception component 1002 in a transceiver.

The determination component 1008 may detect that an antenna of a second wireless communication device is to perform a channel sensing procedure on a channel during a time occasion. The transmission component 1004 may transmit, during the time occasion in one or more directions other than a direction of the antenna of the second wireless communication device, a signal that satisfies an energy detection threshold.

The determination component 1008 may determine the channel based at least in part on one or more measurements of one or more channels. The determination component 1008 may determine the channel based at least in part on channel information from the second wireless communication device.

The determination component 1008 may determine the time occasion based at least in part on scheduling information that is coordinated between the first wireless communication device and the second wireless communication device.

The transmission component 1004 may coordinate, with one or more other wireless communication devices, another time occasion during which the first wireless communication device and the one or more other wireless communication devices refrain from transmitting and during which served UEs are not scheduled to transmit.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
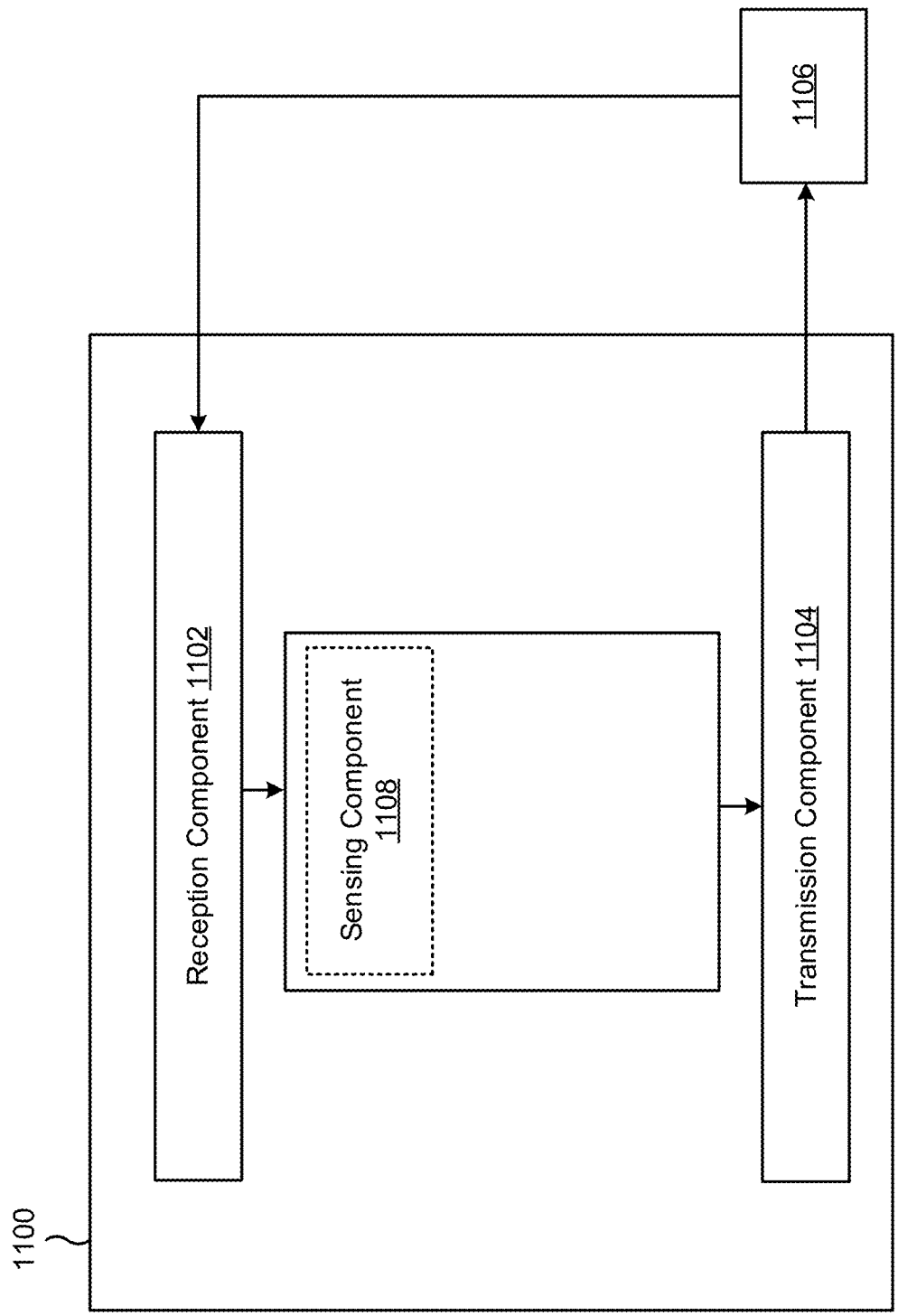

FIG. 11 is a block diagram of an example apparatus 1100 for wireless communication. The apparatus 1100 may be a first wireless communication device (such as a TRP or a UE), or a first wireless communication device may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, TRP, or another wireless communication device) using the reception component 1102 and the transmission component 1104. As further shown, the apparatus 1100 may include a sensing component 1108, among other examples.

In some aspects, the apparatus 1100 may be configured to perform one or more operations described herein in connection with FIGS. 1-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the first wireless communication device described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a demodulator, a MIMO detector, a receive processor, a controller/processor, a memory, or a combination thereof, of the first wireless communication device described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1100. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the first wireless communication device described above in connection with FIG. 2. In some aspects, the transmission component 1104 may be co-located with the reception component 1102 in a transceiver.

The transmission component 1104 may transmit, to a second wireless communication device, channel information indicating a channel in which a channel sensing procedure is to be performed during a time occasion. The sensing component 1108 may perform the channel sensing procedure on the channel during the time occasion.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a first wireless communication device, comprising: detecting that an antenna of a second wireless communication device is to perform a channel sensing procedure on a channel during the time occasion; and transmitting, during the time occasion in one or more directions other than a direction of the antenna of the second wireless communication device, a signal that satisfies an energy detection threshold.

Aspect 2: The method of Aspect 1, wherein transmitting the signal that satisfies the energy detection threshold in one or more directions other than the direction of the antenna includes generating, during the time occasion, a null signal in the direction of the antenna.

Aspect 3: The method of Aspects 1 or 2, wherein transmitting the signal that satisfies the energy detection threshold in one or more directions other than the direction of the antenna includes transmitting a signal towards the antenna of the second wireless communication device that does not satisfy the energy detection threshold.

Aspect 4: The method of any of Aspects 1-3, wherein transmitting the signal that satisfies the energy detection threshold in one or more directions other than the direction of the antenna includes not transmitting signal energy towards the antenna of the second wireless communication device.

Aspect 5: The method of any of Aspects 1-4, wherein transmitting the signal that satisfies the energy detection threshold in one or more directions other than the direction of the antenna includes transmitting the signal that satisfies the energy detection threshold in one or more directions other than the direction of the antenna in coordination with a third wireless communication device that is to transmit a signal that satisfies the energy detection threshold in one or more directions other than a direction of the antenna from the third wireless communication device.

Aspect 6: The method of any of Aspects 1-5, wherein the channel sensing procedure is a listen before talk procedure.

Aspect 7: The method of any of Aspects 1-6, further comprising determining the channel based at least in part on one or more measurements of one or more channels.

Aspect 8: The method of any of Aspects 1-7, further comprising determining the channel based at least in part on channel information from the second wireless communication device.

Aspect 9: The method of any of Aspects 1-8, further comprising determining the time occasion based at least in part on scheduling information that is coordinated between the first wireless communication device and the second wireless communication device.

Aspect 10: The method of any of Aspects 1-9, wherein the first wireless communication device and the second wireless communication device are transmit receive points (TRPs) in a multi-TRP system that coordinates access to the channel.

Aspect 11: The method of any of Aspects 1-9, wherein the first wireless communication device and the second wireless communication device are user equipments (UEs) in a group of UEs that coordinate access to the channel.

Aspect 12: The method of any of Aspects 1-11, further comprising coordinating, with one or more other wireless communication devices, another time occasion during which the first wireless communication device and the one or more other wireless communication devices refrain from transmitting and during which served user equipments (UEs) are not scheduled to transmit.

Aspect 13: A method of wireless communication performed by a first wireless communication device, comprising: transmitting, to a second wireless communication device, channel information indicating a channel in which a channel sensing procedure is to be performed during a time occasion; and performing the channel sensing procedure on the channel during the time occasion.

Aspect 14: The method of Aspect 13, wherein transmitting the channel information includes transmitting the channel information in response to a request from the second wireless communication device for the channel information.

Aspect 15: The method of Aspect 13 or 14, wherein the first wireless communication device and the second wireless communication device are transmit receive points (TRPs) in a multi-TRP system that coordinates access to the channel.

Aspect 16: The method of Aspect 13 or 14, wherein the first wireless communication device and the second wireless communication device are user equipments (UEs) in a group of UEs that coordinate access to the channel.

Aspect 17: The method of any of Aspects 13-16, wherein performing the channel sensing procedure includes performing a listen before talk procedure.

Aspect 18: An apparatus for wireless communication at a device, comprising a processor; memory coupled with the processor; and instructions stored in the memory and executable by the processor to cause the apparatus to perform the method of one or more Aspects of Aspects 1-17.

Aspect 18: A device for wireless communication, comprising a memory and one or more processors coupled to the memory, the memory and the one or more processors configured to perform the method of one or more Aspects of Aspects 1-17.

Aspect 19: An apparatus for wireless communication, comprising at least one means for performing the method of one or more Aspects of Aspects 1-17.

Aspect 20: A non-transitory computer-readable medium storing code for wireless communication, the code comprising instructions executable by a processor to perform the method of one or more Aspects of Aspects 1-17.

Aspect 21: A non-transitory computer-readable medium storing a set of instructions for wireless communication, the set of instructions comprising one or more instructions that, when executed by one or more processors of a device, cause the device to perform the method of one or more Aspects of Aspects 1-17.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first transmit receive point (TRP), comprising:
   one or more memories; and
   one or more processors coupled to the one or more memories, the one or more processors configured to:
   detect that an antenna of a second TRP is to perform a channel sensing procedure on a channel during a time occasion; and
   transmit, in one or more directions other than a direction of the antenna of the second TRP, a signal that exceeds an energy detection threshold during the time occasion that the antenna of the second TRP is to perform the channel sensing procedure.

2. The first TRP of claim 1, wherein the one or more processors, when transmitting the signal that exceeds the energy detection threshold in one or more directions other than the direction of the antenna, are configured to generate, during the time occasion, a null signal in the direction of the antenna.

3. The first TRP of claim 1, wherein the one or more processors, when transmitting the signal that exceeds the energy detection threshold in one or more directions other than the direction of the antenna, are configured to transmit a signal towards the antenna of the second TRP that does not exceed the energy detection threshold.

4. The first TRP of claim 1, wherein the one or more processors, when transmitting the signal that exceeds the energy detection threshold in one or more directions other than the direction of the antenna, are configured to not transmit signal energy towards the antenna of the second TRP.

5. The first TRP of claim 1, wherein the one or more processors, when transmitting the signal that exceeds the energy detection threshold in one or more directions other than the direction of the antenna, are configured to transmit the signal that exceeds the energy detection threshold in one or more directions other than the direction of the antenna in coordination with a third wireless communication device that is to transmit a signal that exceeds the energy detection threshold in one or more directions other than a direction of the antenna from the third wireless communication device.

6. The first TRP of claim 1, wherein the channel sensing procedure is a listen before talk procedure.

7. The first TRP of claim 1, wherein the one or more processors are further configured to determine the channel based at least in part on one or more measurements of one or more channels.

8. The first TRP of claim 1, wherein the one or more processors are further configured to determine the channel based at least in part on channel information from the second TRP.

9. The first TRP of claim 1, wherein the one or more processors are further configured to determine the time occasion based at least in part on scheduling information that is coordinated between the first TRP and the second TRP.

10. The first TRP of claim 1, wherein the first TRP and the second TRP are in a multi-TRP system that coordinates access to the channel.

11. The first TRP of claim 1, wherein the one or more processors are further configured to coordinate, with one or more other TRPs, another time occasion during which the first TRP and the one or more other TRPs refrain from transmitting and during which user equipments (UEs) served by the first TRP and served by the one or more other TRPs are not scheduled to transmit.

12. The first TRP of claim 1, wherein the one or more processors are further configured to:
   receive, from the second TRP, channel information indicating a channel in which the channel sensing procedure is to be performed during the time occasion, wherein detecting that the antenna of the second TRP is to perform the channel sensing procedure is based at least in part on receiving the channel information from the second TRP.

13. The first TRP of claim 1, wherein transmitting, during the time occasion and in the one or more directions other than the direction of the antenna of the second TRP, the signal that exceeds the energy detection threshold is based at least in part on detecting that the antenna of the second TRP is to perform the channel sensing procedure on the channel during the time occasion.

14. The first TRP of claim 1, wherein transmitting the signal that exceeds the energy detection threshold during the time occasion blocks a wireless communication device from accessing the channel during the time occasion.

15. A first transmission reception point (TRP), comprising:
one or more memories; and
one or more processors coupled to the one or more memories, the one or more processors configured to:
transmit, to a second TRP, channel information indicating a channel in which a channel sensing procedure is to be performed during a time occasion; and
perform, during the time occasion, the channel sensing procedure on the channel in coordination with the second TRP that is to transmit, during the time occasion, a signal that satisfies an energy detection threshold in one or more directions other than a direction of an antenna of the first TRP.

16. The first TRP of claim 15, wherein the one or more processors, when transmitting the channel information, are configured to transmit the channel information in response to a request from the second TRP for the channel information.

17. The first TRP of claim 15, wherein the first TRP and the second TRP are in a multi-TRP system that coordinates access to the channel.

18. The first TRP of claim 15, wherein the one or more processors, when performing the channel sensing procedure, are configured to perform a listen before talk procedure.

19. A method of wireless communication performed by a first transmission reception point (TRP), comprising:
detecting that an antenna of a second TRP is to perform a channel sensing procedure on a channel during a time occasion; and
transmitting, in one or more directions other than a direction of the antenna of the second TRP, a signal that exceeds an energy detection threshold during the time occasion that the antenna of the second TRP is to perform the channel sensing procedure.

20. The method of claim 19, wherein transmitting the signal that exceeds the energy detection threshold in one or more directions other than the direction of the antenna includes generating, during the time occasion, a null signal in the direction of the antenna.

21. The method of claim 19, wherein transmitting the signal that exceeds the energy detection threshold in one or more directions other than the direction of the antenna includes transmitting a signal towards the antenna of the second TRP that does not exceed the energy detection threshold.

22. The method of claim 19, wherein transmitting the signal that exceeds the energy detection threshold in one or more directions other than the direction of the antenna includes not transmitting signal energy towards the antenna of the second TRP.

23. The method of claim 19, wherein transmitting the signal that exceeds the energy detection threshold in one or more directions other than the direction of the antenna includes transmitting the signal that exceeds the energy detection threshold in one or more directions other than the direction of the antenna in coordination with a third wireless communication device that is to transmit a signal that exceeds the energy detection threshold in one or more directions other than a direction of the antenna from the third wireless communication device.

24. The method of claim 19, further comprising determining the channel based at least in part on one or more measurements of one or more channels or on channel information from the second TRP.

25. The method of claim 19, further comprising determining the time occasion based at least in part on scheduling information that is coordinated between the first TRP and the second TRP.

26. The method of claim 19, wherein the first TRP and the second TRP are in a multi-TRP system that coordinates access to the channel.

27. The method of claim 19, further comprising coordinating, with one or more other TRPs, another time occasion during which the first TRP and the one or more other TRPs refrain from transmitting and during which user equipments (UEs) served by the first TRP and served by the one or more other TRPs are not scheduled to transmit.

28. A method of wireless communication performed by a first transmission reception point (TRP), comprising:
transmitting, to a second TRP, channel information indicating a channel in which a channel sensing procedure is to be performed during a time occasion; and
performing, during the time occasion, the channel sensing procedure on the channel in coordination with the second TRP that is to transmit, during the time occasion, a signal that satisfies an energy detection threshold in one or more directions other than a direction of an antenna of the first TRP.

29. The method of claim 28, wherein transmitting the channel information includes transmitting the channel information in response to a request from the second TRP for the channel information.

30. The method of claim 28, wherein the first TRP and the second TRP are in a multi-TRP system that coordinates access to the channel.

* * * * *